(12) United States Patent
Mauritz

(10) Patent No.: US 8,705,337 B2
(45) Date of Patent: Apr. 22, 2014

(54) EFFICIENT ZADOFF-CHU SEQUENCE GENERATION

(75) Inventor: Oskar Mauritz, Johanneshov (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 236 days.

(21) Appl. No.: 13/060,024

(22) PCT Filed: Aug. 22, 2008

(86) PCT No.: PCT/EP2008/061031
§ 371 (c)(1),
(2), (4) Date: Apr. 7, 2011

(87) PCT Pub. No.: WO2010/020291
PCT Pub. Date: Feb. 25, 2010

(65) Prior Publication Data
US 2011/0176406 A1    Jul. 21, 2011

(51) Int. Cl.
*H04J 11/00* (2006.01)
*H04W 72/04* (2009.01)
*H04L 5/00* (2006.01)

(52) U.S. Cl.
CPC .... *H04W 72/0466* (2013.01); *H04J 2011/0096* (2013.01); *H04L 5/0048* (2013.01)
USPC .......................................... 370/208; 708/400

(58) Field of Classification Search
USPC ........................ 370/208, 252, 203; 375/295
See application file for complete search history.

(56) References Cited

U.S. PATENT DOCUMENTS

| 8,179,777 B2* | 5/2012 | Oketani ..................... 370/203 |
| 8,179,810 B2* | 5/2012 | Onggosanusi et al. ...... 370/252 |
| 8,295,389 B2* | 10/2012 | Han et al. ................... 375/295 |
| 2010/0020905 A1* | 1/2010 | Mansour et al. ............. 375/343 |

FOREIGN PATENT DOCUMENTS

| JP | 2008011912 A | 1/2008 |
| WO | 2008/080258 A1 | 7/2008 |
| WO | 2009093628 A1 | 7/2009 |

OTHER PUBLICATIONS

David, J. P. et al. "Hardware Complexity of Modular Multiplication and Exponentiation." IEEE Transactions on Computers, vol. 56, No. 10, Oct. 2007.
3rd Generation Partnership Project. "RACH Sequence Allocation for Efficient Matched Filter Implementation." 3GPP TSG RAN WG1 Meeting #50, R1-073623, Athens, Greece, Aug. 20-24, 2007.

\* cited by examiner

*Primary Examiner* — Wei Zhao
*Assistant Examiner* — Lionel Preval
(74) *Attorney, Agent, or Firm* — Coats and Bennett, P.L.L.C.

(57) ABSTRACT

The present application discloses methods and apparatus for generating a Zadoff-Chu sequence for use by a mobile station. One embodiment discloses generating exponents oof elements of a Zadoff-Chu sequence representing a preamble for uplink synchronization of a mobile station or a mobile station reference signal by first obtaining a preamble index defining the Zadoff-Chu sequence. Then an initial exponent of the first element in the Zadoff-Chu sequence and an initial first difference between exponents of consecutive elements of the Zadoff-Chu sequence are determined. Finally the embodiment discloses determining exponents of the remaining elements in the Zadoff-Chu sequence from the initial first difference and the initial exponent in an iterative procedure that avoids multiplication operations.

24 Claims, 5 Drawing Sheets

EFFICIENT ZADOFF-CHU SEQUENCE GENERATION

TECHNICAL FIELD

The present invention relates generally to efficient Zadoff-Chu sequence generation, and especially to generation of preambles and reference signal sequences in mobile communication systems.

BACKGROUND

In a mobile communications system, uplink synchronization is required before data can be transmitted in the uplink. In E-UTRA, uplink synchronization of a mobile is initially performed in the random access procedure. The mobile initiates the random access procedure by selecting a random access preamble from a set of allocated preambles in the cell where the mobile is located, and transmitting the selected random access preamble. In the base station, a receiver correlates the received signal with a set of all random access preambles allocated in the cell to determine the transmitted preamble.

The random access preamble sequences in E-UTRA are designed such that the autocorrelation is ideal and such that the cross-correlation between two different preambles is small. These properties enable accurate time estimates needed for the uplink synchronization and good detection properties of the preambles. These random access preamble sequences in E-UTRA are derived from Zadoff-Chu sequences of odd length. Zadoff-Chu sequences $p_{u,q}(n)$ of length N, where N is odd, are defined as (see [1]):

$$p_{u,q}(n) = W^{un(n+1)/2+qn},$$
$$n = 0, 1, \ldots, N-1;$$
$$W = e^{\frac{-j2\pi}{N}}$$

(1)

where the integers u and N are relatively prime, i.e. the greatest common divisor of u and N is 1. Furthermore, q is an arbitrary integer and j is the imaginary unit. The random access preambles in E-UTRA are defined in time domain as cyclic shifts of Zadoff-Chu root sequences of odd length with q=0 (see [2]):

$$p_u(n) = p_{u,0}(n) = W^{un(n+1)/2}, n=0,1,\ldots,N-1$$

(2)

The random access preamble in E-UTRA contains a cyclic prefix, which makes it advantageous to perform the correlation of the received signal with the random access preambles in the frequency domain. The structure of a random access preamble receiver in a base station is shown in FIG. 1.

In FIG. 1 a received signal is forwarded to a block 10 for removing the cyclic prefix (CP). The remaining signal is subjected to a Discrete Fourier Transform (DFT) in block 12. The obtained discrete Fourier transform is forwarded to a set of correlators 14, where it is multiplied element-wise by a set of DFTs of preamble sequences indexed by $u_{min} \ldots u_{max}$ and generated by blocks 16. The products are subjected to an Inverse Discrete Fourier Transform (IDFT) in blocks 18. The correlator output signals are then forwarded to a corresponding set of detectors 20, which determine the generated preamble that best matches the received signal.

The preambles used for uplink synchronization are also generated in the mobile stations. Another application of Zadoff-Chu sequences is generation of mobile station reference signal sequences transmitted on the uplink. In contrast to the random access preambles, which are defined in time domain, the reference signals in E-UTRA are defined in frequency domain by (2) together with truncation of the Zadoff-Chu sequence, i.e. some samples at the end of the sequence are not included in the reference signal.

The exponent $un(n+1)/2+qn$ in the definition of the Zadoff-Chu sequence is always an integer because either n or n+1 is even and so one of them must be divisible by 2. Furthermore, since u, q and n are all integers, the exponent must be an integer as well. Since the function $W^m$ is periodic in m with period N and all entities in the exponent are integers, all arithmetic can be performed modulo N in the exponent $un(n+1)/2+qn$.

Division modulo N differs from ordinary division and involves the inverse modulo N. The inverse of b modulo N is defined as the integer such that $0<b^{-1}<N$ and $bb^{-1}=1 \bmod N$. The inverse modulo N of b exists if and only if b and N are relatively prime. If N is prime $b^{-1}$ exists for all $b \neq \bmod N$. Division of a by b modulo N is accomplished by multiplying a by the inverse modulo N of b: $ab^{-1}$.

Performing the arithmetic modulo N in the exponent gives an alternative and useful expression of the Zadoff-Chu sequence:

$$p_{u,q}(n) = W^{un(n+1)\cdot 2^{-1}qn}, n=0,1,\ldots,N-1$$

(3)

Note that with the notation used for modulo N arithmetic, $2^{-1}$ is not the same as $\frac{1}{2}$. Instead it denotes the inverse modulo N of 2 (which depends on N).

It has been shown (see [3]) that the DFT of $p_u(n)$ is given by:

$$P_u(k) = W^{-k(k+u)\cdot 2^{-1}u^{-1}} \sum_{n=0}^{N-1} p_u((n+u^{-1}k) \bmod N)$$

(4)

Since the sum in (4) is always over all elements of $p_u(n)$, the sum is independent of k, thus:

$$P_u(k) = A_u W^{-k(k+u)\cdot 2^{-1}u^{-1}}$$

(5)

where $A_u$ is independent of k. From Parseval's theorem one can show (see [4]) that $|A_u|=\sqrt{N}$ for any value of u and thus $A_u=\sqrt{N}e^{j\Phi_u}$, where $e^{j\Phi_u}$ is a constant complex phase factor.

Comparing (3) and (5) it is clear that the DFT of the Zadoff-Chu sequence is itself a Zadoff-Chu sequence multiplied by a constant:

$$P_u(k) = A_u W^{-k(k+u)\cdot 2^{-1}u^{-1}} = A_u p_{-u^{-1},\bar{q}}(k), \bar{q}=(u^{-1}-1)\cdot 2^{-1}$$

(6)

In each correlator 14 in FIG. 1, the received signal is multiplied element-wise with the DFT of a preamble in the cell.

In a straightforward generator of the DFT of the preamble, the exponent $a(k)=-k(k+u)\cdot 2^{-1}u^{-1}$ in (6) is calculated for every value of k and the values of $W^{a(k)}$ are either calculated or read from a table. The detectors 20 only need the absolute values of the respective correlator outputs, so only the absolute value of $A_u$ is relevant. Since the absolute value, $|A_u|=\sqrt{N}$ for any value of u, $A_u$ can be completely discarded in the correlators. Thus, for the purpose of correlation the preamble may be represented by a Zadoff-Chu sequence both in the time and frequency domain, which implies that a representation of the DFT of the preamble may be generated directly in the frequency domain as a Zadoff-Chu sequence.

The sequence generation in existing technology requires two multiplications to calculate the exponent $a(k)=-k(k+u)\cdot 2^{-1}u^{-1}$ in (6) for every sample in the sequence. The total computational complexity of these multiplications may be significant for long sequences. For instance, the length of the random access preamble in E-UTRA is N=839 for most preamble formats, and in a worst case the receiver needs to correlate the received signal with as many as 64 different Zadoff-Chu sequences (this corresponds to 64 blocks 16 in FIG. 1).

Document [6] describes modulation of a Zadoff-Chu sequence with at least two modulation sequences for deriving a Generalized Chirp-Like (GCL) sequences used for correlation with an input signal.

Document [7] discusses Zadoff-Chu sequence allocation allowing efficient matched filter implementation for frequency domain and time domain RACH preamble detection.

SUMMARY

An object of the present invention is to generate the exponents of elements of Zadoff-Chu sequences for radio communication systems with less complexity than the prior art.

This object is achieved in accordance with the attached claims.

Briefly, the present invention generates the exponents of elements of a Zadoff-Chu sequence of length N, where N is odd, in an iterative procedure based on modulo N arithmetic to avoid multiplications.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
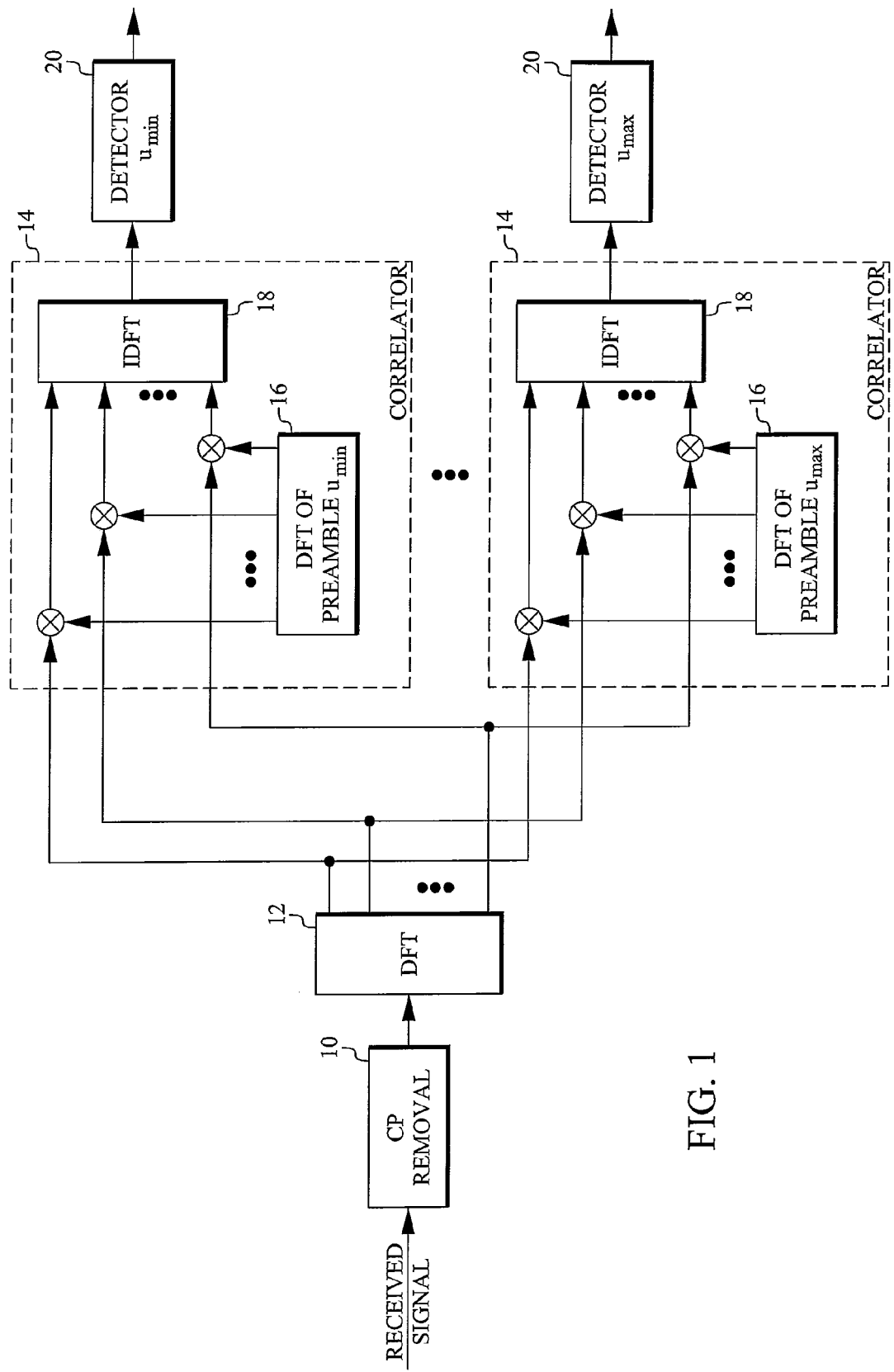
FIG. 1 is a block diagram illustrating the structure of a random access preamble receiver in a base station.

According to the present invention the exponent a(k) is calculated iteratively from a(k−1) and from the first and second differences between subsequent values of a(k):

$$d^{(1)}(k) = a(k) - a(k-1) = -(2k+u-1) \cdot 2^{-1} u^{-1} \quad (7)$$

and $$d^{(2)}(k) = d(1)(k) - d(1)(k-1) = -2 \cdot 2^{-1} u^{-1} = -u^{-1} \quad (8)$$

Such an iterative calculation of the exponent is possible since a(k) is a quadratic polynomial in k. This is similar to the calculation of a quadratic permutation polynomial for interleavers given in [5]. The initial values a(0) and $d^{(1)}(0)$ are given by:

$$a(0)=0 \text{ and } d^{(1)}(0)=(1-u) \cdot 2^{-1} u^{-1} (u^{-1}-1) \cdot 2^{-1} \quad (9)$$

It is straightforward to show that with ordinary arithmetic:

$$d^{(1)}(0) = \begin{cases} \dfrac{u^{-1}-1}{2}, & u^{-1} \text{ odd} \\ \dfrac{u^{-1}}{2} + \dfrac{N-1}{2}, & u^{-1} \text{ even} \end{cases} \quad (10)$$

Figure 2:
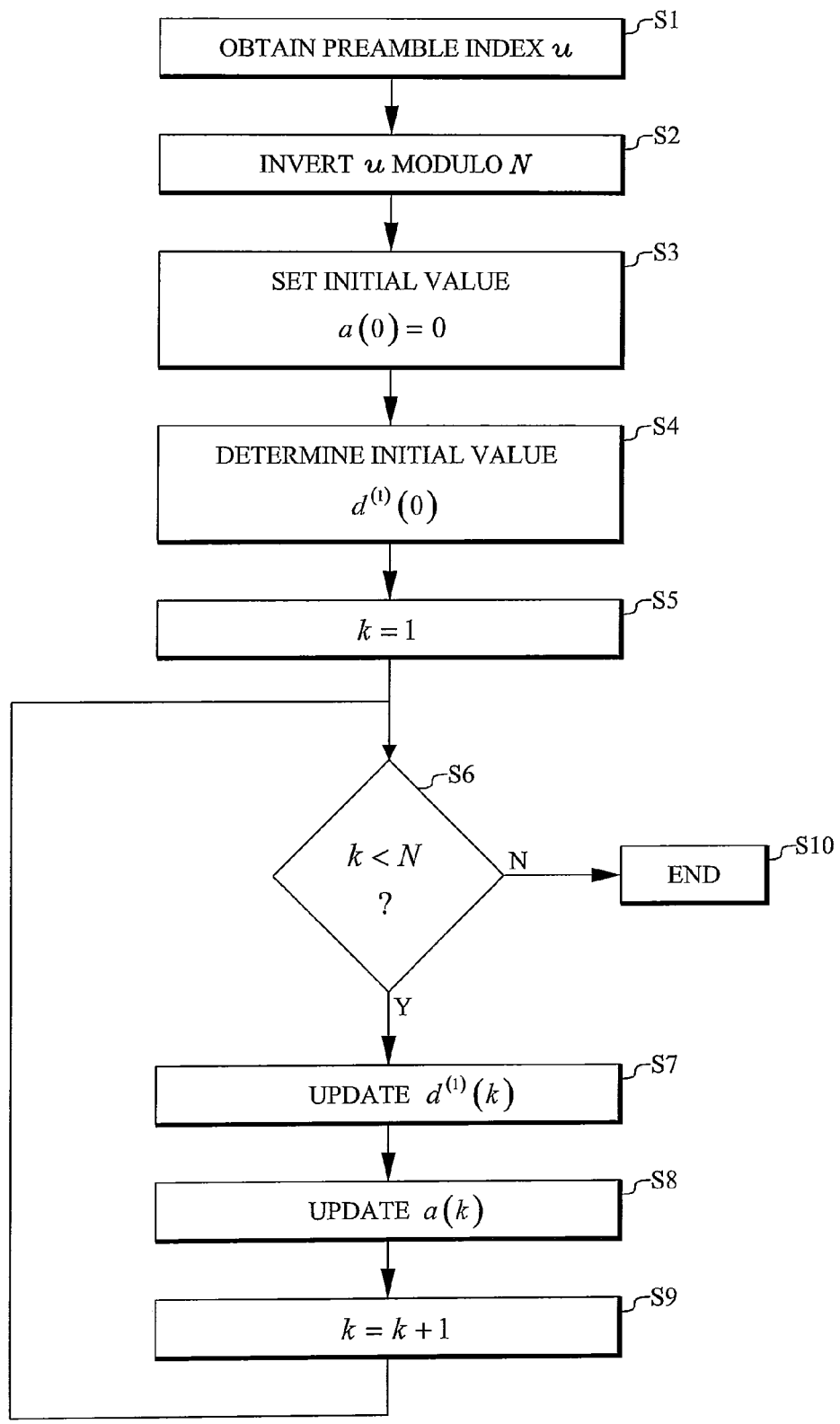
FIG. 2 is a flow chart illustrating an embodiment of the method in accordance with the present invention for generating exponents of elements of a Zadoff-Chu sequence representing, in the frequency domain, a preamble for uplink synchronization of mobile stations.

From (7), (8), (9) and (10), the exponents a(k) are calculated iteratively for all values of k by the following procedure:

$$a(0) = 0 \quad (11)$$

$$d^{(1)}(0) = \begin{cases} \dfrac{u^{-1}-1}{2}, & u^{-1} \text{ odd} \\ \dfrac{u^{-1}}{2} + \dfrac{N-1}{2}, & u^{-1} \text{ even} \end{cases}$$

for $k = 1 \ldots N-1$ $d^{(1)}(k) = (d^{(1)}(k-1) - u^{-1}) \bmod N$ $a(k) = (a(k-1) + d^{(1)}(k)) \bmod N$ end Note that the expression $d^{(2)}(k)$ is not explicitly involved in this procedure, since it is a constant that may be used directly. In an alternative embodiment the calculations modulo N in (11) can be simplified to give the following procedure:

$$a(0) = 0 \quad (12)$$

$$d^{(1)}(0) = \begin{cases} \dfrac{u^{-1}-1}{2}, & u^{-1} \text{ odd} \\ \dfrac{u^{-1}}{2} + \dfrac{N-1}{2}, & u^{-1} \text{ even} \end{cases}$$

for $k = 1 \ldots N-1$ $d^{(1)}(k) = d^{(1)}(k-1) - u^{-1}$ if $d^{(1)}(k) < 0$ then $d^{(1)}(k) = d^{(1)}(k) + N$ $a(k) = a(k-1) + d^{(1)}(k)$ if $a(k) > N-1$ then $a(k) = a(k) - N$ end FIG. 2 is a flow chart illustrating an embodiment of the method in accordance with the present invention for generating exponents of elements of a Zadoff-Chu sequence representing, in the frequency domain, a preamble for uplink synchronization of mobile stations. Step S1 obtains the preamble index u of the sequence to be generated. Step S2 inverts u modulo N. Steps S3 sets the initial value a(0)=0 and step S4 determines $d^{(1)}(0)$ in accordance with the first parts of (11) and (12). Step S5 sets k=1. Step S6 tests whether k<N. If so, step S7 updates $d^{(1)}(k)$ and step S8 updates a(k). Thereafter step S9 increments k and the procedure returns to step S6. The procedure ends at step S10 when k=N. Steps S5-S10 can, for example, be implemented by a for loop as in (11) or (12).

Figure 3:
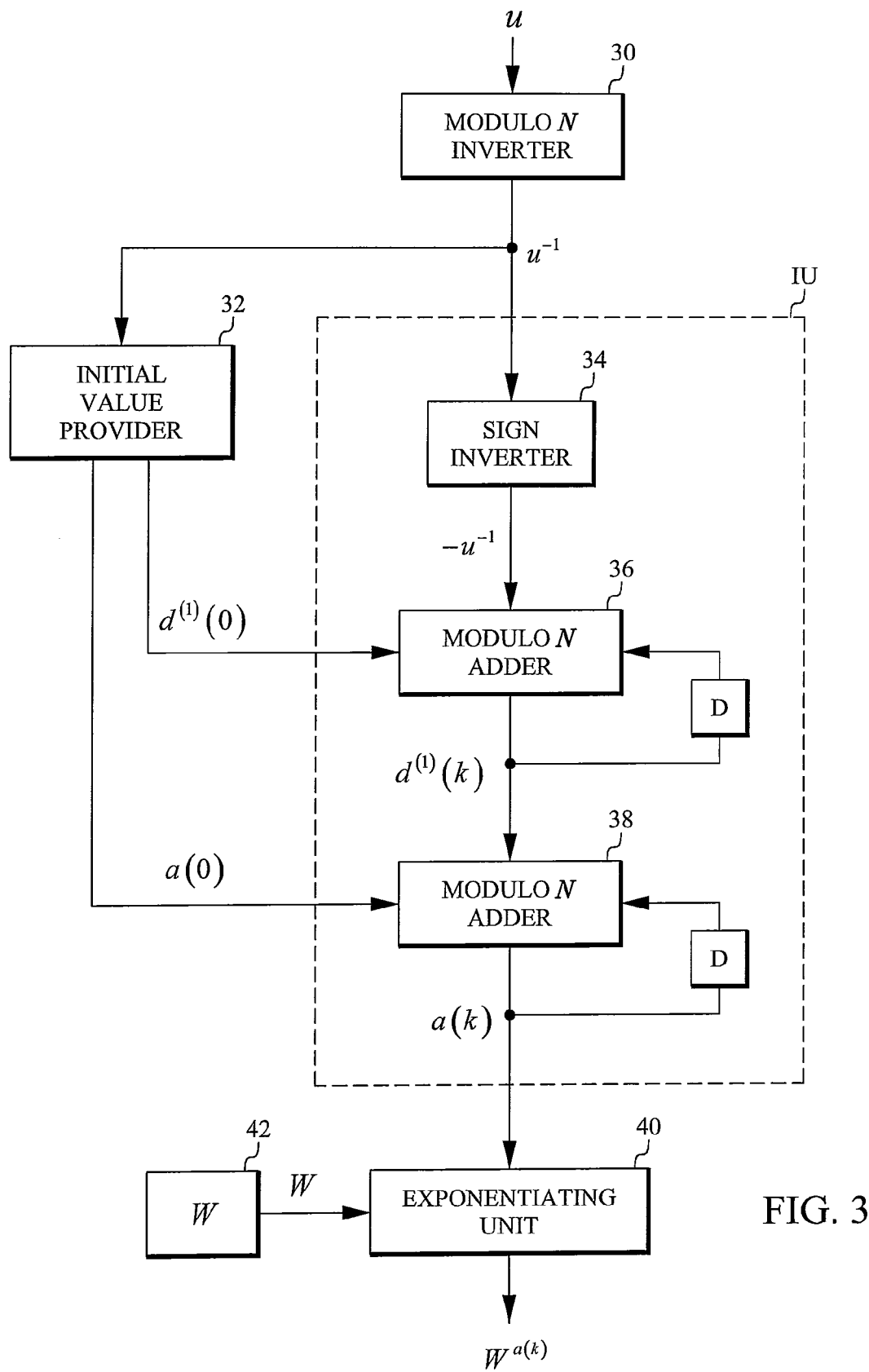
FIG. 3 is a block diagram of an embodiment of an apparatus in accordance with the present invention for generating exponents of elements of a Zadoff-Chu sequence representing, in the frequency domain, a preamble for uplink synchronization of mobile stations.

FIG. 3 is a block diagram of an embodiment of an apparatus in accordance with the present invention for generating exponents of elements of a Zadoff-Chu sequence representing, in the frequency domain, a preamble for uplink synchronization of mobile stations. The index u of the sequence to be generated is forwarded to a modulo N inverter 30. The modulo N inverted value $u^{-1}$ is forwarded to an initial value provider 32, which calculates $d^{(1)}(0)$ and $a(0)$. The modulo N inverted value $u^{-1}$ is also forwarded to a sign inverter 34, which stores the sign inverted value $-u^{-1}$. The sign inverted value $-u^{-1}$ and the initial value $d^{(1)}(0)$ are forwarded to a modulo N adder 36, which iteratively calculates successive values $d^{(1)}(k)$ in accordance with either:

$$d^{(1)}(k)=(d^{(1)}(k-1)-u^{-1}) \bmod N \qquad (13)$$

or $$d^{(1)}(k)=d^{(1)}(k-1)-u^{-1}$$

$$\text{if } d^{(1)}(k)<0 \text{ then } d^{(1)}(k)=(k)+N \qquad (14)$$

This is represented by the indicated feedback loop to modulo N adder 36, which includes a delay element D that introduces a delay corresponding to 1 iteration.

Similarly the initial value $a(0)$ is used to start iterative calculations of successive values $a(k)$ in a modulo N adder 38 using the calculated values $d^{(1)}(k)$ in accordance with either:

$$a(k)=(a(k-1)+d^{(1)}(k)) \bmod N \qquad (15)$$

or $$a(k)=a(k-1)+d^{(1)}(k)$$

$$\text{if } a(k)>N-1 \text{ then } a(k)=a(k)-N \qquad (16)$$

This is represented by the indicated feedback loop to modulo N adder 38, which includes a delay element D that introduces a delay corresponding to 1 iteration.

The resulting exponents $a(k)$ are forwarded to an exponentiating unit 40 which forms the elements $W^{a(k)}$ of the sequence using the value $W=e^{-j2\pi/N}$ stored in a memory cell 42.

Due to the structure of (13)-(16) the iterations (in the iteration unit IU including blocks 34, 36, 38, D) may be performed by first calculating all the values $d^{(1)}(k)$ and then using these values to calculate the values $a(k)$. Such a procedure, however, requires storing the values $d^{(1)}(k)$ until they are needed for calculating the values $a(k)$. As an alternative, illustrated by (11) and (12), both iterations may be performed in parallel, which requires storing only the values of $d^{(1)}(k)$ and $a(k)$ used in the next iteration.

Although the description has so far been restricted to generation of Zadoff-Chu sequences representing preambles in base station receivers for uplink synchronization of mobile stations, other applications where the same principles may be used are also feasible. One such application is generation of the preambles in the mobile station. Another application is generation of reference signal sequences, which are also represented by Zadoff-Chu sequences, in mobile and base stations.

It is also possible to generate Zadoff-Chu sequences representing preambles in the time domain instead of the frequency domain. For example, the mobile station may generate the preamble either in the time domain or the frequency domain. In the time domain the exponents $a(k)=-k(k+u) \cdot 2^{-1} u^{-1}$ in (6) are replaced by the exponents $a(n)=un(n+1) \cdot 2^{-1}$ in (3). Thus (7) and (8) will be replaced by $$d^{(1)}(n)=a(n)-a(n-1)=nu \qquad (17)$$

and $$d^{(2)}(n)=d^{(1)}(n)-d^{(1)}(n-1)=u, \qquad (18)$$

respectively. This implies that (11) will be replaced by:

$$a(0)=0$$

$$d^{(1)}(0)=0$$

for $n=1 \ldots N-1$ $$d^{(1)}(n)=(d^{(1)}(n-1)+u) \bmod N$$

$$a(n)=(a(n-1)+d^{(1)}(n)) \bmod N$$

end $\qquad (19)$ and (12) will be replaced by:

$$a(0)=0$$

$$d^{(1)}(0)=0$$

for $n=1 \ldots N-1$ $$d^{(1)}(n)=d^{(1)}(n-1)+u$$

$$\text{if } d^{(1)}(n)<0 \text{ then } d^{(1)}(n)=(n)+N$$

$$a(n)=a(n-1)+d^{(1)}(n)$$

$$\text{if } a(n)>N-1 \text{ then } a(n)=a(n)-N$$

end $\qquad (20)$

Figure 4:
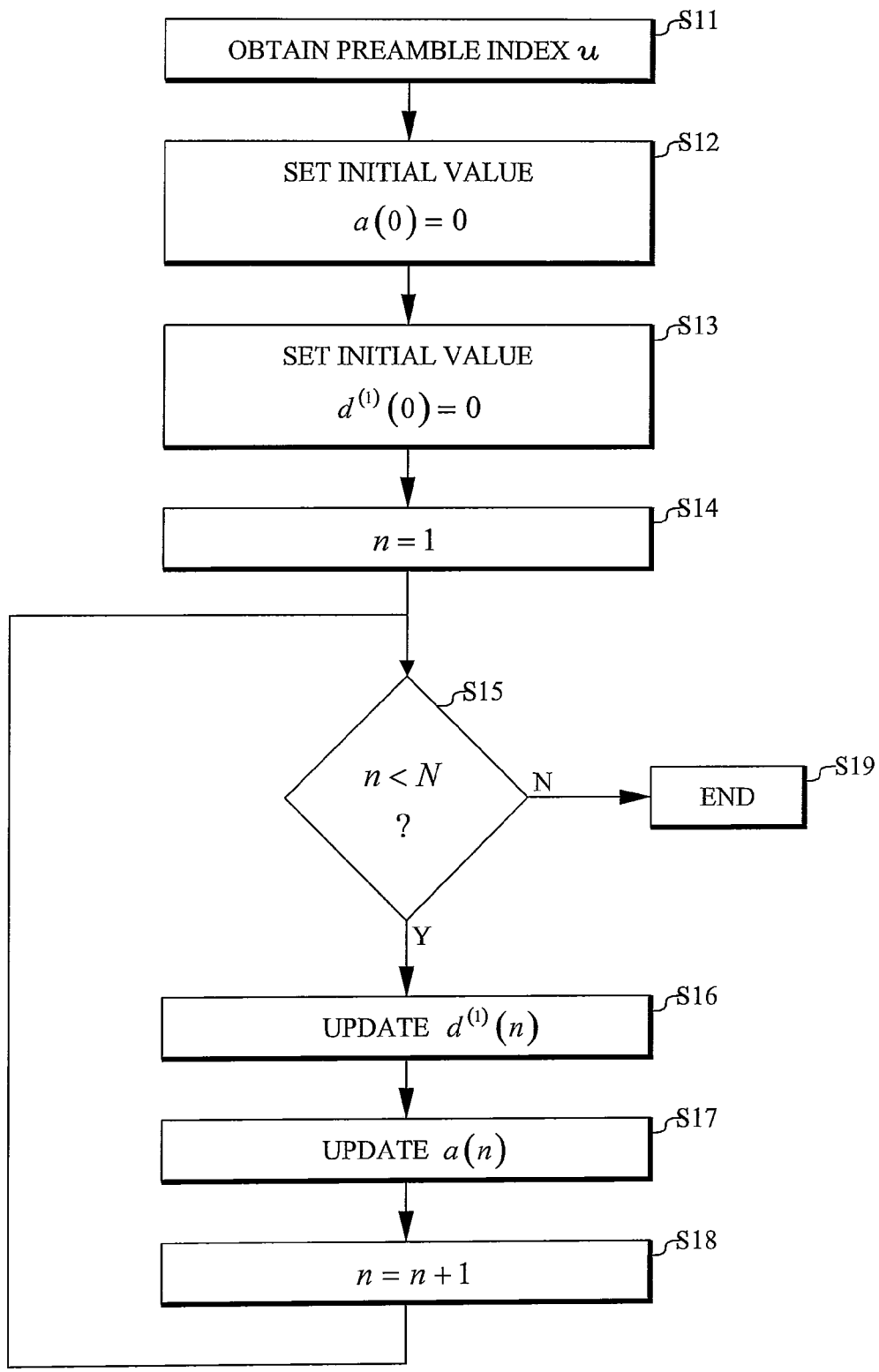
FIG. 4 is a flow chart illustrating an embodiment of the method in accordance with the present invention for generating exponents of elements of a Zadoff-Chu sequence representing, in the time domain, a preamble for uplink synchronization of mobile stations.

FIG. 4 is a flow chart illustrating an embodiment of the method in accordance with the present invention for generating exponents of elements of a Zadoff-Chu sequence representing, in the time domain, a preamble for uplink synchronization of mobile stations. Step S11 obtains the preamble index u of the sequence to be generated. Steps S12 and S3 set the initial values $a(0)$ and $d^{(1)}(0)$, respectively, to 0 in accordance with the first parts of (19) and (20). Step S4 sets n=1. Step S15 tests whether n<N. If so, step S16 updates $d^{(1)}(n)$ and step S17 updates $a(n)$. Thereafter step S18 increments n and the procedure returns to step S15. The procedure ends at step S19 when n=N. Steps S14-S19 can, for example, be implemented by a for loop as in (19) or (20).

Figure 5:
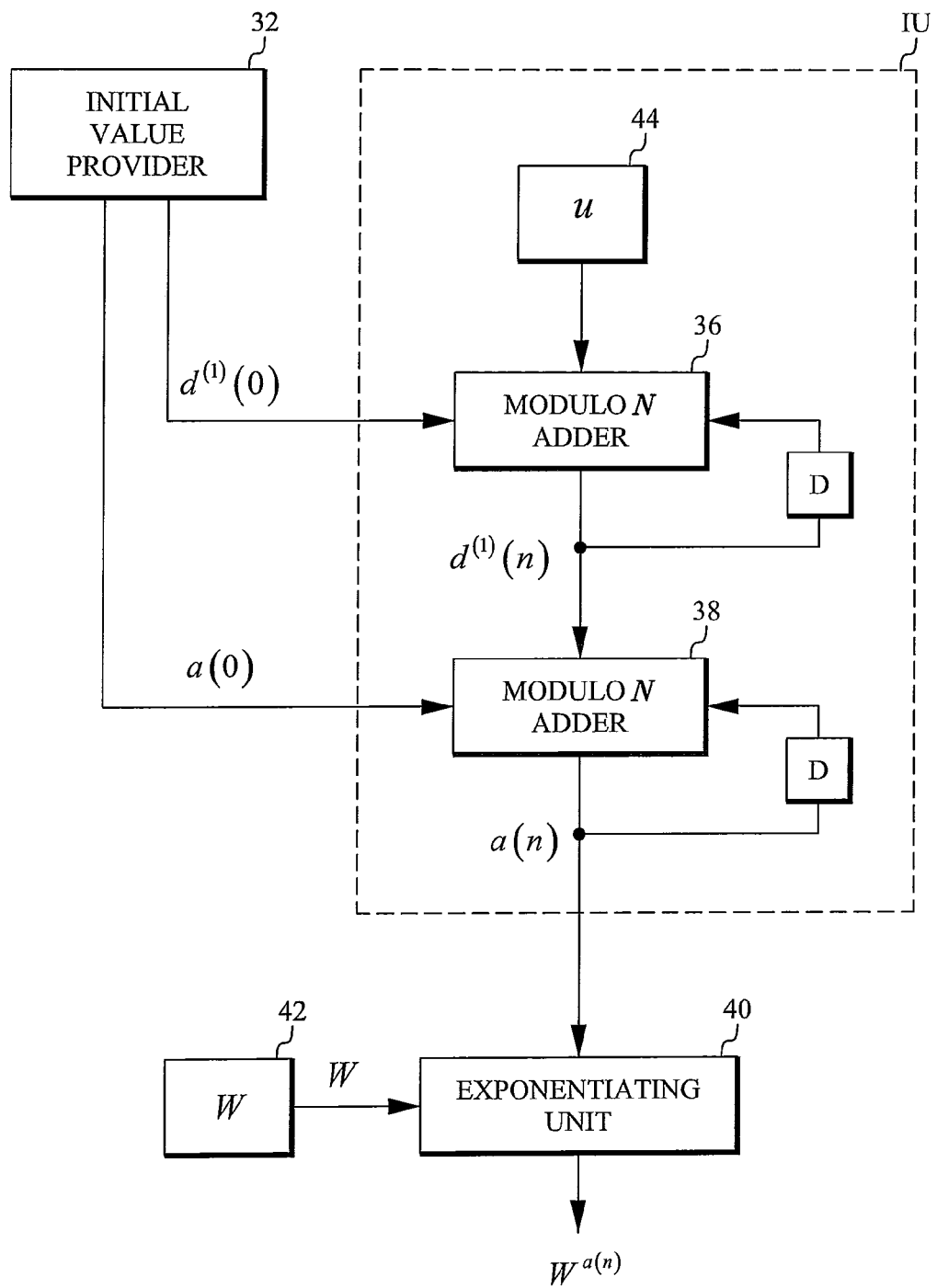
FIG. 5 is a block diagram of an embodiment of an apparatus in accordance with the present invention for generating exponents of elements of a Zadoff-Chu sequence representing, in the time domain, a preamble for uplink synchronization of mobile stations.

FIG. 5 is a block diagram of an embodiment of an apparatus in accordance with the present invention for generating exponents of elements of a Zadoff-Chu sequence representing, in the time domain, a preamble for uplink synchronization of mobile stations. The index u of the sequence to be generated is forwarded from a memory cell 44 to a modulo N adder 36. Modulo N adder 36 also receives the initial value $d^{(1)}(0)$ from an initial value provider 32. Modulo N adder 36 iteratively calculates successive values $d^{(1)}(n)$ in accordance with either:

$$d^{(1)}(n)=(d^{(1)}(n-1)+u) \bmod N \qquad (21)$$

or $$d^{(1)}(n)=d^{(1)}(n-1)+u$$

$$\text{if } d^{(1)}(n)<0 \text{ then } d^{(1)}(n)=d^{(1)}(n)+N \qquad (22)$$

This is represented by the indicated feedback loop to modulo N adder 36, which includes a delay element D that introduces a delay corresponding to 1 iteration.

Similarly the initial value a(0) is used to start iterative calculations of successive values a(n) in a modulo N adder 38 using the calculated values $d^{(1)}(n)$ in accordance with either:

$$a(n)=(a(n-1)+d^{(1)}(n))\text{modulo } N \quad (23)$$

or $$a(n)=a(n-1)+d^{(1)}(n)$$

if $a(n)>N-1$ then $a(n)=a(n)-N$ (24)

This is represented by the indicated feedback loop to modulo N adder 38, which includes a delay element D that introduces a delay corresponding to 1 iteration.

The resulting exponents a(n) are forwarded to an exponentiating unit 40 which forms the elements $W^{a(n)}$ of the sequence using the value $W=e^{-j2\pi/N}$ stored in a memory cell 42.

Due to the structure of (21)-(24) the iterations (in the iteration unit IU including blocks 44, 36, 38, D) may be performed by first calculating all the values $d^{(1)}(n)$ and then using these values to calculate the values a(n). Such a procedure, however, requires storing the values $d^{(1)}(n)$ until they are needed for calculating the values a(n). As an alternative, illustrated by (19) and (20), both iterations may be performed in parallel, which requires storing only the values of $d^{(1)}(n)$ and a(n) used in the next iteration.

The principles described above for generating Zadoff-Chu sequences representing preambles in the time domain may also be used to generate reference signals in the frequency domain, both in mobile and base stations, if this is desirable.

Typically the various blocks in the described embodiments are implemented by one or several micro processors or micro/signal processor combinations and corresponding software.

It is appreciated that the present invention provides a simple way to generate Zadoff-Chu sequences avoiding multiplications. An advantage is a complexity reduction in the implementation of the Zadoff-Chu sequence generation compared to the prior art.

It will be understood by those skilled in the art that various modifications and changes may be made to the present invention without departure from the scope thereof, which is defined by the appended claims.

ABBREVIATIONS

3GPP 3rd Generation Partnership Project
DFT Discrete Fourier Transform
E-UTRA Evolved UMTS Terrestrial Radio Access
IEEE Institute of Electrical and Electronics Engineers
TS Technical Specification
UMTS Universal Mobile Telephony System

REFERENCES

[1] B. Popovic, "Generalized chirp-like polyphase sequences with optimum correlation properties," IEEE Trans. Inform. Theory, vol. 38, no. 4, pp. 1406-1409, 1992.
[2] 3GPP, TS 36.211, "Physical Channels and modulation" v 8.2.0, section 5.7.2, March 2008.
[3] 3GPP R1-071409, Huawei, "Efficient matched filters for paired root Zadoff-Chu sequences," March 2007.
[4] D. V. Sarwate, "Bounds on crosscorrelation and autocorrelation of sequences," IEEE Trans. Inform. Theory, vol. IT-25, pp 720-724, 1979.
[5] M. K. Cheng et al, "An interleaver implementation for the serially concatenated pulse-position modulation decoder," in Proc. IEEE International Symposium on Circuits and Systems, 2006.
[6] WO 2008/080258 A (HUAWEI TECH CO LTD [CN]; Mauritz Oskar (SE), Popovic Branislav (SE)) 10 Jul. 2008.
[7] Panasonic et al: "RACH sequence allocation for efficient matched filter implementation" 3GPP Draft; R1-073623, vol. RAN WG1, no. Athens, Greece; 20070820, 15 Aug. 2007, XP0501077221.

The invention claimed is:

1. A method of generating exponents of elements of a Discrete Fourier transform (DFT) of a Zadoff-Chu sequence that represents either a mobile station reference signal or a preamble for uplink synchronization of mobile stations, wherein the Zadoff-Chu sequence is of length N, where N is odd, the method comprising:
   obtaining an index u defining the Zadoff-Chu sequence and a module N inverse of the index;
   determining an initial exponent of a first element in the DFT of the Zadoff-Chu sequence a(0);
   determining an initial first difference between exponents of consecutive elements of the Zadoff-Chu sequence $d^{(1)}$(0) using the module N inverse of the index;
   determining exponents of the remaining elements in the DFT of the Zadoff-Chu sequence from the initial first difference and the initial exponent in an iterative procedure that avoids multiplication operations and
   conveying the DFT of the Zadoff-Chu sequence to a transmitter or a receiver configured to transmit or receive a signal using the DFT of the Zadoff-Chu sequence.

2. The method of claim 1, wherein the initial exponent a(0) and the initial first difference $d^{(1)}(0)$ are determined as:

$$a(0) = 0$$

$$d^{(1)}(0) = \begin{cases} \dfrac{u^{-1}-1}{2}, & u^{-1} \text{ odd} \\ \dfrac{u^{-1}}{2} + \dfrac{N-1}{2}, & u^{-1} \text{ even} \end{cases}$$

where $u^{-1}$ is the modulo N inverse of the obtained index u; and wherein the iterative procedure for determining exponents a(k), k=1 . . . N−1 of the remaining elements in the Zadoff-Chu sequence is defined as:

for k=1 . . . N−1

$$d^{(1)}(k)=(d^{(1)}(k-1)-u^{-1}) \bmod N$$

$$a(k)=(a(k-1)+d^{(1)}(k)) \bmod N$$

end.

3. The method of claim 1, wherein the initial exponent a(0) and the initial first difference $d^{(1)}(0)$ are determined as:

$$a(0) = 0$$

$$d^{(1)}(0) = \begin{cases} \dfrac{u^{-1}-1}{2}, & u^{-1} \text{ odd} \\ \dfrac{u^{-1}}{2} + \dfrac{N-1}{2}, & u^{-1} \text{ even} \end{cases}$$

where $u^{-1}$ is the modulo N inverse of the obtained index u; and wherein the iterative procedure for determining exponents a(k), k=1 ... N−1 of the remaining elements in the Zadoff-Chu sequence is defined as:

for $k=1 \ldots N-1$ $d^{(1)}(k)=d^{(1)}(k-1)-u^{-1}$ if $d^{(1)}(k)<0$ then $d^{(1)}(k)=d^{(1)}(k)+N$ $a(k)=a(k-1)+d^{(1)}(k)$ if $a(k)>N-1$ then $a(k)=a(k)-N$ end.

4. The method of claim 1, wherein the initial exponent a(0) and the initial first difference $d^{(1)}(0)$ are set to zero; and wherein the iterative procedure for determining exponents a(n), n—1 ... N−1 of the remaining elements in the Zadoff-Chu sequence is defined as:

For $n=1 \ldots N-1$ $d^{(1)}(n)=(d^{(1)}(n-1)+u) \bmod N$ $a(n)=(a(n-1)+d^{(1)}(n)) \bmod N$ where u is the obtained index.

5. The method of claim 1, wherein the initial exponent a(0) and the initial first difference $d^{(1)}(0)$ are set to zero; and wherein the iterative procedure for determining exponents a(n), n=1 ... N−1 of the remaining elements in the Zadoff-Chu sequence is defined as:

For $n=1 \ldots N-1$ $d^{(1)}(n)=d^{(1)}(n-1)+u$ if $d^{(1)}(n)<0$ then $d^{(1)}(n)=d^{(1)}(n)+N$ $a(n)=a(n-1)+d^{(1)}(n)$ if $a(n)>N-1$ then $a(n)=a(n)-N$ end where u is the obtained index.

6. An apparatus configured to generate exponents of elements of a Discrete Fourier transform (DFT) of a Zadoff-Chu sequence a(0), said apparatus comprising:
   an initial value provider circuit configured to determine an initial exponent of a first element of the Zadoff-Chu sequence a(0), and
   an initial first difference between exponents of consecutive elements of the same DFT of the Zadoff-Chu sequence $d^{(1)}(0)$; wherein said initial first difference is calculated using a module N inverse of an index u of the Zadoff-Chu sequence; and
   an iteration circuit configured to determine exponents of the remaining elements in the DFT of the Zadoff-Chu sequence from the initial first difference and the initial exponent in an iterative procedure that avoids multiplication operations, wherein the Zadoff-Chu sequence comprising the determined exponents in the DFT of the Zadoff-Chu sequence represents either a mobile station reference signal or a preamble for uplink synchronization of mobile stations, wherein the DFT of the Zadoff-Chu sequence is of length N, where N is odd.

7. The method of claim 6, wherein the initial value provider circuit is configured to determine the initial exponent a(0) and the initial first difference $d^{(1)}(0)$ as:

$a(0) = 0$ $$d^{(1)}(0) = \begin{cases} \dfrac{u^{-1}-1}{2}, & u^{-1} \text{ odd} \\ \dfrac{u^{-1}}{2} + \dfrac{N-1}{2}, & u^{-1} \text{ even} \end{cases}$$

where $u^{-1}$ is the modulo N inverse of an index u defining the Zadoff-Chu sequence; and wherein the iteration circuit is configured to determine exponents a(k), k=1 ... N−1 of the remaining elements in the Zadoff-Chu sequence in accordance with the iterative procedure:

for $k=1 \ldots N-1$ $d^{(1)}(k)=(d^{(1)}(k-1)-u^{-1}) \bmod N$ $a(k)=(a(k-1)+d^{(1)}(k)) \bmod N$ end.

8. The method of claim 6, wherein the initial value provider circuit is configured to determine the initial exponent a(0) and the initial first difference $d^{(1)}(0)$ as:

$a(0) = 0$ $$d^{(1)}(0) = \begin{cases} \dfrac{u^{-1}-1}{2}, & u^{-1} \text{ odd} \\ \dfrac{u^{-1}}{2} + \dfrac{N-1}{2}, & u^{-1} \text{ even} \end{cases}$$

where $u^{-1}$ is the modulo N inverse of the index u defining the Zadoff-Chu sequence; and
   wherein the iteration circuit is configured to determine exponents a(k), k=1 ... N−1 of the remaining elements in the Zadoff-Chu sequence in accordance with the iterative procedure:

for $k=1 \ldots N-1$ $d^{(1)}(k)=d^{(1)}(k-1)-u^{-1}$ if $d^{(1)}(k)<0$ then $d^{(1)}(k)=d^{(1)}(k)+N$ $a(k)=a(k-1)+d^{(1)}(k)$ if $a(k)>N-1$ then $a(k)=a(k)-N$ end.

9. The method of claim 6, wherein the initial value provider circuit is configured to set the initial exponent a (0) and the initial first difference $d^{(1)}(0)$ to zero; and wherein the iteration unit circuit is configured to determine exponents a(n), n−1 ... N−1 of the remaining elements in the Zadoff-Chu sequence accordance with the iterative procedure:

For $n=1 \ldots N-1$ $d^{(1)}(n)=(d^{(1)}(n-1)+u) \bmod N$ $a(n)=(a(n-1)+d^{(1)}(n)) \bmod N$ end where u is the index defining the Zadoff-Chu sequence.

10. The method of claim 9, wherein the apparatus is configured to generate exponents of elements of a Zadoff-Chu sequence that represents a preamble for uplink synchronization of mobile stations, and wherein the apparatus is included in a Zadoff-Chu sequence generator.

11. The method of claim 10, wherein said Zadoff-Chu sequence generator is included in a mobile station.

12. The method of claim 9, wherein the apparatus is configured to generate exponents of elements of a Zadoff-Chu sequence that represents a mobile station reference signal, and wherein the apparatus is included in a Zadoff-Chu sequence generator.

13. The method of claim 12, wherein the Zadoff-Chu sequence generator is included in a mobile station.

14. The method of claim 12, wherein the Zadoff-Chu sequence generator is included in a base station.

15. The apparatus of claim 6, wherein the initial value provider circuit is configured to set the initial exponent a(0) and the initial first difference $d^{(1)}(0)$ to zero; and wherein the iteration unit is configured to determine exponents a(n), n=1 ... N−1 of the remaining elements in the Zadoff-Chu sequence in accordance with the iterative procedure:

For n=1 ... N−1

$d^{(1)}(k) = d^{(1)}(n-1) + u$ if $d^{(1)}(n) < 0$ then $d^{(1)}(n) = d^{(1)}(n) + N$ $a(n) = a(n-1) + d^{(1)}(n)$ if $a(n) > N-1$ then $a(n) = a(n) - N$ where u is the index defining the Zadoff-Chu sequence.

16. The apparatus of claim 15, wherein the apparatus is configured to generate exponents of elements of a Zadoff-Chu sequence that represents a preamble for uplink synchronization of mobile stations, and wherein the apparatus is included in a Zadoff-Chu sequence generator.

17. The apparatus of claim 16, wherein the Zadoff-Chu sequence generator is included in a mobile station.

18. The apparatus of claim 15, wherein the apparatus is configured to generate exponents of elements of a Zadoff-Chu sequence that represents a mobile station reference signal, and wherein the apparatus is included in a Zadoff-Chu sequence generator.

19. The apparatus of claim 18, wherein the Zadoff-Chu sequence generator is included in a mobile station.

20. The apparatus of claim 18, wherein the Zadoff-Chu sequence generator is included in a base station.

21. The apparatus of claim 6, wherein the apparatus is configured to generate exponents of elements of a Zadoff-Chu sequence that represents a preamble for uplink synchronization of mobile stations, and wherein the apparatus is included in a Zadoff-Chu sequence generator.

22. The apparatus of claim 21, wherein the Zadoff-Chu sequence generator is included in a mobile station.

23. A random access preamble receiver including a set of Zadoff-Chu sequence generators, each Zadoff-Chu sequence generator including an apparatus configured to generate exponents of elements of a Discrete Fourier transform of a Zadoff-Chu sequence
said apparatus comprising:
an initial value provider circuit configured to determine an initial exponent of the first element of the DFT of the Zadoff-Chu sequence, and an initial first difference between exponents of consecutive elements of the same DFT of the Zadoff-Chu sequence, wherein the initial first difference is calculated using a module N inverse of an index of the Zadoff-Chu sequence; and an iteration circuit configured to determine exponents of the remaining elements in the DFT of the Zadoff-Chu sequence from the initial first difference and the initial exponent in an iterative procedure that avoids multiplication operations, wherein the Zadoff-Chu sequence comprising the determined exponents of the Zadoff-Chu sequence represents a preamble for uplink synchronization of mobile stations, wherein the DFT of the Zadoff-Chu sequence is of length N, where N is odd.

24. The random access preamble receiver of claim 23, wherein the random access preamble receiver is included in a base station.

* * * * *

UNITED STATES PATENT AND TRADEMARK OFFICE
CERTIFICATE OF CORRECTION

PATENT NO. : 8,705,337 B2
APPLICATION NO. : 13/060024
DATED : April 22, 2014
INVENTOR(S) : Mauritz It is certified that error appears in the above-identified patent and that said Letters Patent is hereby corrected as shown below:

On the Title Page, Item (57), under "ABSTRACT", in Column 2, Line 3, delete "exponents oof" and insert -- exponents of --, therefor.

In the Specification

In Column 2, Line 16, delete "integer" and insert -- integer $b^{-1}$ --, therefor.

In Column 2, Line 25, in Equation (3), delete " $P_{u,q}(n) = W^{un(n+1) \cdot 2^{-1} qn}, n = 0, 1, \ldots, N-1$ " and insert -- $P_{u,q}(n) = W^{un(n+1) \cdot 2^{-1} + qn}, \quad n = 0, 1, \ldots, N-1$ --, therefor.

In Column 2, Line 32, in Equation (4), delete " $P_u(k) = W^{-k(k+u) \cdot 2^{-1} u^{-1}} \sum_{n=0}^{N-1} p_u((n+u^{-1}k) \bmod N)$ " and insert -- $P_u(k) = W^{-k(k+u) \cdot 2^{-1} u^{-1}} \sum_{n=0}^{N-1} p_u\left((n+u^{-1}k) \bmod N\right)$ --, therefor.

In Column 3, Line 2, delete "to 64" and insert -- to 64, --, therefor.

In Column 3, Line 42, delete "stations:" and insert -- stations; --, therefor.

In Column 3, Line 64, in Equation (8), delete " $d^{(2)}(k) = d^{(1)}(k) - d^{(1)}(k-1) = -2 \cdot 2^{-1} u^{-1} = -u^{-1}$ " and insert -- $d^{(2)}(k) = d^{(1)}(k) - d^{(1)}(k-1) = -2 \cdot 2^{-1} u^{-1} = -u^{-1}$ --, therefor.

Signed and Sealed this
Second Day of September, 2014

Michelle K. Lee
*Deputy Director of the United States Patent and Trademark Office*

CERTIFICATE OF CORRECTION (continued)
U.S. Pat. No. 8,705,337 B2

In Column 4, Line 5, in Equation (9), delete " $a(0)=0$ and $d^{(1)}(0)=(1-u)\cdot 2^{-1}u^{-1}(u^{-1}-1)\cdot 2^{-1}$ " and insert -- $a(0)=0$ and $d^{(1)}(0)=(1-u)\cdot 2^{-1}u^{-1}=(u^{-1}-1)\cdot 2^{-1}$ --, therefor.

In Column 5, Line 19, in Equation (14), delete " if $d^{(1)}(k)<0$ then $d^{(1)}(k)=(k)+N$ " and insert -- if $d^{(1)}(k)<0$ then $d^{(1)}(k)=d^{(1)}(k)+N$ --, therefor.

In Column 5, Line 67, in Equation (18), delete " $d^{(2)}(n)=d^{(1)}(n)-d^{(1)}(n-1)=u,$ " and insert -- $d^{(2)}(n)=d^{(1)}(n)-d^{(1)}(n-1)=u$ , --, therefor.

In Column 6, Line 38, delete "S12 and S3" and insert -- S12 and S13 --, therefor.

In Column 6, Line 40, delete "S4" and insert -- S14 --, therefor.

In the Claims

In Column 8, Line 26, in Claim 1, delete "operations" and insert -- operations; --, therefor.

In Column 8, Line 43, in Claim 2, delete "in the" and insert -- in the DFT of the --, therefor.

In Column 9, Line 1, in Claim 3, delete "in the" and insert -- in the DFT of the --, therefor.

In Column 9, Line 18, in Claim 4, delete "n-1...N-1 of the remaining elements in the" and insert -- n=1...N-1 of the remaining elements in the DFT of the --, therefor.

In Column 9, Line 31, in Claim 5, delete "in the" and insert -- in the DFT of the --, therefor.

In Column 10, Line 1, in Claim 7, delete "method" and insert -- apparatus --, therefor.

In Column 10, Line 25, in Claim 8, delete "method" and insert -- apparatus --, therefor.

In Column 10, Line 54, in Claim 9, delete "method" and insert -- apparatus --, therefor.

In Column 10, Line 55, in Claim 9, delete "a (0)" and insert -- a(0) --, therefor.

In Column 10, Line 57, in Claim 9, delete "unit circuit" and insert -- circuit --, therefor.

CERTIFICATE OF CORRECTION (continued)
U.S. Pat. No. 8,705,337 B2

In Column 11, Line 1, in Claim 10, delete "method" and insert -- apparatus --, therefor.

In Column 11, Line 2, in Claim 10, delete "of a" and insert -- of the DFT of a --, therefor.

In Column 11, Line 6, in Claim 11, delete "method" and insert -- apparatus --, therefor.

In Column 11, Line 8, in Claim 12, delete "method" and insert -- apparatus --, therefor.

In Column 11, Line 9, in Claim 12, delete "of a" and insert -- of the DFT of a --, therefor.

In Column 11, Line 13, in Claim 13, delete "method of claim 12, wherein the" and insert -- apparatus of claim 12, wherein said --, therefor.

In Column 11, Line 15, in Claim 14, delete "method of claim 12, wherein the" and insert -- apparatus of claim 12, wherein said --, therefor.

In Column 11, Line 18, in Claim 15, delete "a (0)" and insert -- a(0) --, therefor.

In Column 11, Line 21, in Claim 15, delete "in the" and insert -- in the DFT of the --, therefor.

In Column 11, Line 34, in Claim 16, delete "of a" and insert -- of the DFT of a --, therefor.

In Column 11, Line 38, in Claim 17, delete "wherein the" and insert -- wherein said --, therefor.

In Column 11, Line 41, in Claim 18, delete "of a" and insert -- of the DFT of a --, therefor.

In Column 12, Line 4, in Claim 19, delete "wherein the" and insert -- wherein said --, therefor.

In Column 12, Line 6, in Claim 20, delete "wherein the" and insert -- wherein said --, therefor.

In Column 12, Line 9, in Claim 21, delete "of a" and insert -- of the DFT of a --, therefor.

In Column 12, Line 13, in Claim 22, delete "wherein the" and insert -- wherein said --, therefor.

In Column 12, Line 19, in Claim 23, delete "sequence" and insert -- sequence, --, therefor.